United States Patent
Caruss et al.

(10) Patent No.: US 10,843,611 B2
(45) Date of Patent: Nov. 24, 2020

(54) VEHICLE SEAT INCLUDING AN ADAPTIVE LATERAL OCCUPANT SUPPORT STRUCTURE

(71) Applicant: Adient Luxembourg Holding S.à r.l., Luxembourg (LU)

(72) Inventors: Nathan Caruss, Ann Arbor, MI (US); Eric Michalak, Canton, MI (US); Brent Burton, Windsor (CA)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 0 days.

(21) Appl. No.: 16/318,534

(22) PCT Filed: Jul. 18, 2017

(86) PCT No.: PCT/US2017/042531
§ 371 (c)(1),
(2) Date: Jan. 17, 2019

(87) PCT Pub. No.: WO2018/017540
PCT Pub. Date: Jan. 25, 2018

(65) Prior Publication Data
US 2019/0315257 A1    Oct. 17, 2019

Related U.S. Application Data (60) Provisional application No. 62/364,093, filed on Jul. 19, 2016.

(51) Int. Cl.
*B60N 2/90*       (2018.01)
*B60N 2/02*       (2006.01)
*B60N 2/22*       (2006.01)

(52) U.S. Cl.
CPC ............. *B60N 2/99* (2018.02); *B60N 2/0232* (2013.01); *B60N 2/0252* (2013.01); *B60N 2/22* (2013.01); *B60N 2002/0272* (2013.01)

(58) Field of Classification Search
CPC ...................................................... B60N 2/99
See application file for complete search history.

(56) References Cited

U.S. PATENT DOCUMENTS

| | | | |
|---|---|---|---|
| 3,825,707 | A | 7/1974 | Hanselmann et al. |
| 4,324,431 | A | 4/1982 | Murphy et al. |
| 4,885,513 | A | 12/1989 | Sakamoto et al. |

(Continued)

FOREIGN PATENT DOCUMENTS

| | | | |
|---|---|---|---|
| CN | 1893857 A | 1/2007 | |
| CN | 105711462 A | 6/2016 | |

(Continued)

OTHER PUBLICATIONS

Chinese Patent and Trademark Office, Office Action in Application No. CN201780044344.4, dated Aug. 31, 2020, 9 pages.

*Primary Examiner* — Timothy J Brindley
(74) *Attorney, Agent, or Firm* — Marshall & Melhorn, LLC (57) ABSTRACT

A vehicle seat that includes a lateral occupant support structure that is movable based on a position of a backrest. The vehicle seat includes a lateral occupant support structure setting system that adapts a position of one or more lateral occupant support structures based on one or more of a position of the backrest and movement of the backrest.

20 Claims, 8 Drawing Sheets

(56) References Cited

U.S. PATENT DOCUMENTS

| | | | | |
|---|---|---|---|---|
| 5,857,743 | A * | 1/1999 | Ligon, Sr. | B60N 2/0232 |
| | | | | 297/284.9 |
| 6,113,051 | A | 9/2000 | Moradell et al. | |
| 7,172,244 | B2 | 2/2007 | Ali et al. | |
| 2004/0140705 | A1 | 7/2004 | McMillen et al. | |
| 2005/0046252 | A1* | 3/2005 | McMillen | B60N 2/66 |
| | | | | 297/284.1 |
| 2008/0191533 | A1* | 8/2008 | Poniatowski | B60N 2/3011 |
| | | | | 297/284.9 |
| 2009/0026821 | A1 | 1/2009 | Macht et al. | |
| 2012/0267928 | A1* | 10/2012 | Mankame | B60N 2/002 |
| | | | | 297/284.4 |
| 2013/0020852 | A1 | 1/2013 | Corcoran | |
| 2018/0141477 | A1* | 5/2018 | Stevens | B60N 2/0232 |
| 2018/0339606 | A1* | 11/2018 | Barbot | B60N 2/0292 |
| 2019/0329685 | A1* | 10/2019 | Seibold | B60N 2/99 |

FOREIGN PATENT DOCUMENTS

| | | | | |
|---|---|---|---|---|
| DE | 3707926 A1 * | 9/1988 | | B60N 2/986 |
| DE | 10214383 A1 * | 10/2003 | | B60N 2/986 |
| DE | 102005051422 A1 * | 5/2007 | | B60N 2/986 |
| DE | 102007038293 A1 * | 4/2009 | | B60N 2/99 |
| DE | 102016220650 A1 * | 4/2018 | | B60N 2/914 |
| EP | 0318355 A1 * | 5/1989 | | B60N 2/99 |
| FR | 2596335 A1 * | 10/1987 | | B60N 2/986 |
| JP | 2018065459 A * | 4/2018 | | B60N 2/68 |

* cited by examiner

VEHICLE SEAT INCLUDING AN ADAPTIVE LATERAL OCCUPANT SUPPORT STRUCTURE

CROSS REFERENCE TO RELATED APPLICATIONS

This application claims the benefit of priority of U.S. provisional application 62/364,093 filed Jul. 19, 2016, the entire contents of which are incorporated herein by reference.

FIELD OF THE INVENTION

The present invention relate to a vehicle seat that includes a lateral occupant support structure that is movable based on a position of a backrest.

BACKGROUND OF THE INVENTION

Conventional vehicle seats do not provide adjustment of a lateral occupant support structure when an occupant engages a backrest.

SUMMARY OF THE INVENTION

It is an object of the invention to provide a vehicle seat that allows movement of a lateral occupant support structure to be adapted based on movement of a backrest. The present invention provides a lateral occupant support structure to be connected with the backrest such that movement of the lateral occupant support structure can be controlled based on movement and/or a position of the backrest. As an occupant engages the backrest, the lateral occupant support structure is actuated to create contact to provide lateral support of the torso and/or thoaraxial region of the occupant. This provides comfort to the occupant during a full range of recliner adjustment of the backrest.

According to the present invention, a vehicle seat comprises a backrest, a lateral occupant support structure, a sensor detecting a position of the backrest and an actuator connected to the sensor. The actuator adjusts a position of the lateral occupant support structure based on input from the sensor.

The vehicle seat may comprise another lateral occupant support structure. The actuator may adjust a position of the another lateral occupant support structure based on the input from the sensor.

The vehicle seat may comprise another actuator connected to the sensor. The another actuator may adjust a position of the another lateral occupant support structure based on input from the sensor.

The vehicle seat may comprise a seat frame and a pivotable connection between the seat frame and the lateral occupant support structure. The sensor may comprise a cable connected to the backrest and the lateral occupant support structure. The actuator may comprise the cable and the pivotable connection.

The sensor may comprise a first cable connected to the backrest and the lateral occupant support structure and a second cable connected to the backrest and the another lateral occupant support structure. The actuator may comprise the first cable and the pivotable connection. The vehicle seat may comprise another pivotable connection between the seat frame and the another lateral occupant support structure. The another actuator may comprise the second cable and the pivotable connection.

The sensor may comprise a flexible band extending from the lateral occupant support structure to the another lateral occupant support structure. At least a portion of the band may be in contact with a rear surface of the backrest. The actuator may comprise the pivotable connection, the another pivotable connection and the flexible band.

The actuator may comprise the pivotable connection and a connecting structure connected to the lateral occupant support structure and the backrest. The another actuator may comprise another pivotable connection and another connecting structure connected to the another lateral occupant support structure and the backrest. The sensor may comprise the connecting structure and the another connecting structure.

The sensor may comprise a first cable connected to the backrest and a first helical slide and a second cable connected to the backrest and a second helical slide. The lateral occupant support structure may be connected to the first helical slide. The lateral occupant support structure and a second cable may be connected to the backrest and the another lateral occupant support structure. The actuator may comprise the first cable and the first helical slide. The another lateral occupant support structure may be connected to the second helical slide. The another actuator may comprise the second cable and the second helical slide.

The another lateral occupant support structure may be located on one side of the backrest and the lateral seat support structure may be located on another side of the backrest.

The sensor may detect at least a deflection of the backrest from an unloaded position to a loaded position of the backrest. The actuator may actuate the lateral occupant support structure such that the lateral occupant support structure is rotated inward in a direction of the backrest from a non-deployed position to a deployed position when the sensor detects deflection of the backrest from the unloaded position to the loaded position of the backrest. The lateral occupant support structure may engage one or more of a torso region of an occupant of the vehicle seat and a thoaraxial region of the occupant of the vehicle seat in the deployed position.

According to the present invention, a vehicle seat comprises the backrest, the lateral occupant support structure and a lateral occupant support structure setting system that sets a position of the lateral support structure based on a position of the backrest.

The lateral occupant support structure and the another lateral occupant support structure may be pivotably connected to the seat frame.

The lateral occupant support structure setting system may comprise the actuator and the sensor. The actuator may receive input from the sensor. The actuator may actuate the lateral occupant support structure and the another lateral occupant support structure based on input from the sensor.

The lateral occupant support structure setting system may comprise the another actuator. The another actuator may receive input from the sensor. The actuator may actuate the another lateral occupant support structure based on input from the sensor.

The lateral occupant support structure setting system may comprise a first cable connected to the backrest and the lateral occupant support structure and a second cable connected to the backrest and the another lateral occupant support structure. The first cable may actuate the lateral occupant support structure such that the lateral occupant support structure is rotated inward in the direction of the backrest from the non-deployed position to the deployed position when the backrest moves from the unloaded position to the loaded position. The second cable may actuate the another lateral occupant support structure such that the another lateral occupant support structure is rotated inward in a direction of the backrest from a non-occupied position to an occupied position when the backrest moves from the unloaded position to the loaded position.

The lateral occupant support structure setting system may comprise a lateral occupant support structure connecting structure extending from the lateral occupant support structure to the another lateral occupant support structure. At least a portion of the lateral occupant support structure connecting structure may engage a rear surface of the backrest. The lateral occupant support structure connecting structure may actuate the lateral occupant support structure and the another lateral occupant support structure such that each of the lateral occupant support structure and the another lateral occupant support structure is rotated inward in a direction of the backrest from the non-occupied position to the occupied position when the backrest moves from the unloaded position to the loaded position.

The lateral occupant support structure setting system may comprise a first lateral occupant support structure connecting structure extending from the lateral occupant support structure to the backrest and a second lateral occupant support structure connecting structure extending from the another lateral occupant support structure to the backrest. The first lateral occupant support structure connecting structure may actuate the lateral occupant support structure such that the lateral occupant support structure is rotated inward in a direction of the occupant of the vehicle seat from the non-deployed position to the deployed position when the backrest moves from the unloaded position to the loaded position. The second lateral occupant support structure connecting structure may actuate the another lateral occupant support structure such that the another lateral occupant support structure is rotated inward in a direction of the occupant of the vehicle seat from an another lateral occupant support structure non-deployed position to an another lateral occupant support structure deployed position when the backrest moves from the unloaded position to the loaded position.

The lateral occupant support structure setting system may comprise the first cable connected to the backrest and the first helical slide and the second cable connected to the backrest and the second helical slide. The lateral occupant support structure may be connected to the first helical slide. The another lateral occupant support structure may be connected to the second helical slide. The first cable may actuate the lateral occupant support structure via the first helical slide such that the lateral occupant support structure rotates inward in the direction of the occupant of the vehicle seat from the non-deployed position to the deployed position when the backrest moves from the unloaded position to the loaded position. The second cable may actuate the another lateral occupant support structure via the second helical element such that the another lateral occupant support structure rotates inward in the direction of the occupant of the vehicle seat from the another lateral occupant support structure non-deployed position to the another lateral occupant support structure deployed position when the backrest moves from the unloaded position to the loaded position.

The another lateral occupant support structure may be located at a spaced location from the lateral occupant support structure.

It is apparent that the above-described features, which will also be explained below, can be used not only in the particular combination described, but also in other combinations or alone, without going beyond the scope of the present invention.

Preferred exemplary embodiments of the present invention are shown in the drawings and will be explained in more detail in the following description, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, the same features are designated with the same reference characters throughout the different embodiments of the invention.

Figure 1:
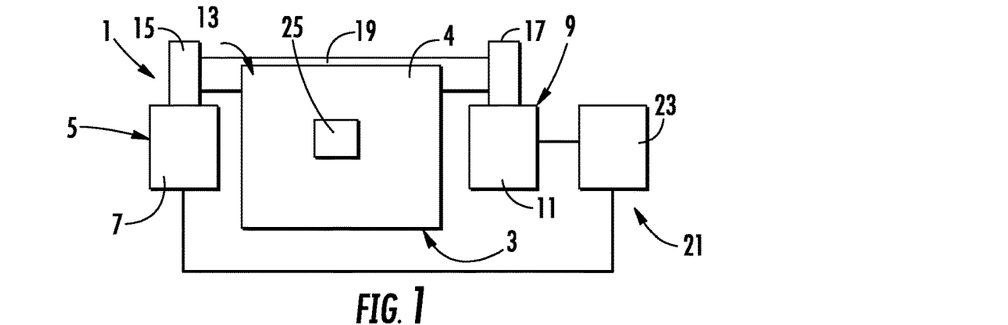
FIG. 1 is a schematic view of a vehicle seat that includes a first embodiment of a lateral occupant support positioning system.

FIG. 1 is a schematic view of a vehicle seat 1. The vehicle seat 1 has a backrest 3 that has a backrest surface 4 for engaging a portion of an occupant when the occupant sits in the vehicle seat 1. The vehicle seat 1 includes a lateral occupant support structure 5 that has a lateral occupant support surface 7 for engaging a torso/thoaraxial region on one side of the occupant when the lateral occupant support structure 5 is in a deployed position. The vehicle seat 1 includes another lateral occupant support structure 9 that has a lateral occupant support surface 11 for engaging another torso/thoaraxial region on another side of the occupant when the another lateral occupant support structure 9 is in a deployed position. The lateral occupant support structure 5 may be in the form of a bolster and the another lateral occupant support structure 9 may be in the form of a bolster. The vehicle seat 1 includes a seat frame 13 that has a seat frame portion 15 and another seat frame portion 17 and a transverse seat frame portion 19 that connects the seat frame portion 15 to the another seat frame portion 17. The backrest 3 is connected to the seat frame 13. The lateral occupant support structure 5 is pivotably connected to the seat frame portion 15 such that the lateral occupant support structure 5 is movable relative to the seat frame 13. The lateral occupant support structure 9 is pivotably connected to the seat frame portion 17 such that the lateral occupant support structure 9 is movable relative to the seat frame 13. The lateral occupant support structure 5 is pivotably connected to the seat frame portion 15. The vehicle seat 1 includes a lateral occupant support positioning system 21 that includes an actuator 23 and a sensor 25. The sensor 25 is connected to the actuator 23. The sensor 25 may be connected to the actuator 23 via a wireless connection, such as via radio frequency or a Blue Tooth wireless connection, or a wired connection, such as one or more wires or cables. The sensor 25 senses a position of the backrest 3. In particular, the sensor 25 senses deflection of the backrest 3. The actuator 23 receives input from the sensor 25 via the wireless connection or the wired connection. The actuator 23 actuates the lateral occupant support structure 5 and the lateral occupant support structure 9 based on the input from the sensor 25 such that the lateral occupant support structure 5 and the lateral occupant support structure 9 move from a non-occupant supporting position to a deployed position. In the non-occupant supporting position, the lateral occupant support structure 5 and the lateral occupant support structure 9 are located a spaced location from a torso/thoaraxial region of the occupant. In the non-deployed position, the lateral occupant support surface 7 and the lateral occupant support surface 11 face in a traveling direction of a vehicle. The non-deployed position of the lateral occupant support structure 5 and the lateral occupant support structure 9 allows an occupant to easily enter and exit the vehicle seat 1. With the lateral occupant support structure 5 in the deployed position and the lateral occupant support structure 9 in the deployed position, the lateral occupant support structure surface 7 engages the torso/thoaraxial region on one side of the occupant and the lateral occupant support structure surface 11 engages the another torso/thoaraxial region on the other side of the occupant.

Figure 2:
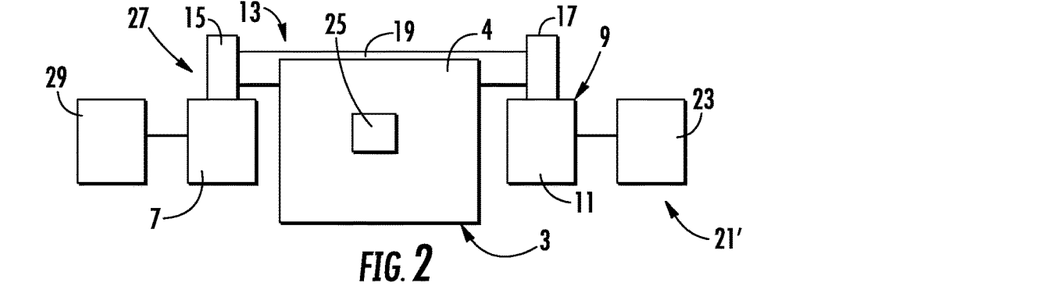
FIG. 2 is a schematic view of a vehicle seat that includes a second embodiment of a lateral occupant support positioning system.

FIG. 2 is a schematic view of a vehicle seat 27. The vehicle seat 27 is the same as the vehicle seat 1 except that the vehicle seat 27 includes a lateral occupant support positioning system 21' that is different from the lateral occupant positioning system 21. The difference between the lateral occupant support positioning system 21' and the lateral occupant positioning system 21 is that the lateral occupant support positioning system 21' includes an additional actuator 29 to provide two actuators 23, 29. The additional actuator 29 is connected to the sensor 25 via a wireless connection or a wired connection. The actuator 23 receives input from the sensor 25 and actuates the lateral occupant support structure 9 from the non-deployed position to the deployed position based on the input received from the sensor 25. The additional actuator 29 receives input from the sensor 25 and actuates the lateral occupant support structure 5 from the non-deployed position to the deployed position based on the input received from the sensor 25. This allows the lateral occupant support structure 9 and the lateral occupant support structure 5 to be actuated independently from each other.

Figure 3:
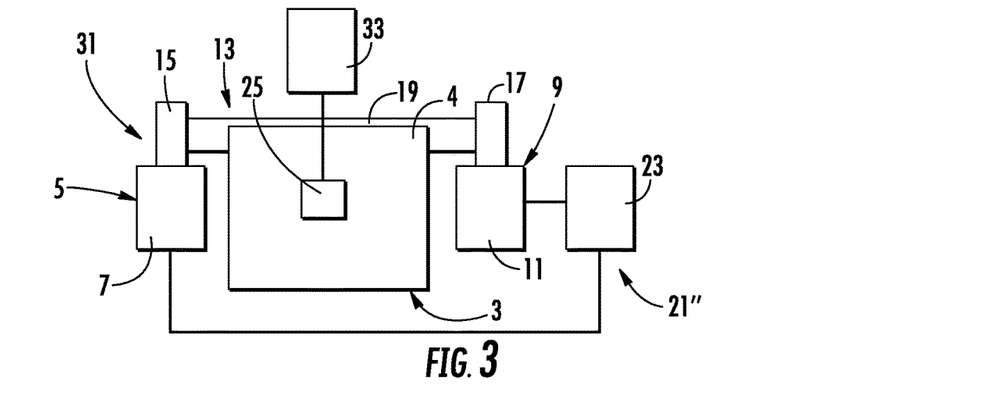
FIG. 3 is a schematic view of a vehicle seat that includes a third embodiment of a lateral occupant support positioning system.

FIG. 3 is a schematic view of a vehicle seat 31. The vehicle seat 31 is the same as the vehicle seat 1 except that the vehicle seat 31 includes a lateral occupant support positioning system 21" that is different from the lateral occupant positioning system 21. The difference between the lateral occupant support positioning system 21" and the lateral occupant positioning system 21 is that the lateral occupant support positioning system 21" includes a controller device 33. The controller device 33 receives the input from the sensor 25 via a wireless connection or a wired connection. The controller device 33 is connected to the actuator 23 via a wireless connection or a wired connection. The actuator 23 actuates the lateral occupant support structure 5 from the non-deployed position to the deployed position and the lateral occupant support structure 9 from the non-deployed position to the deployed position based on the input from the sensor 25. The controller device 33 may include software, hardware or a combination of software and hardware. The hardware of the controller device 33 may measure the movement of the seat back to determine the bolster engagement via a predetermined ratio. The software may measure deflection via sensor input and use the sensor input to determine an output to an actuator where the ratio can be switched to have more than one level of engagement settings. The software of the controller device 33 allows a deployed position to be set or adjusted by the occupant to the occupant's preferred prominence. The controller device 33 may include an interface that allows the occupant to set and adjust the deployed position.

Figure 4:
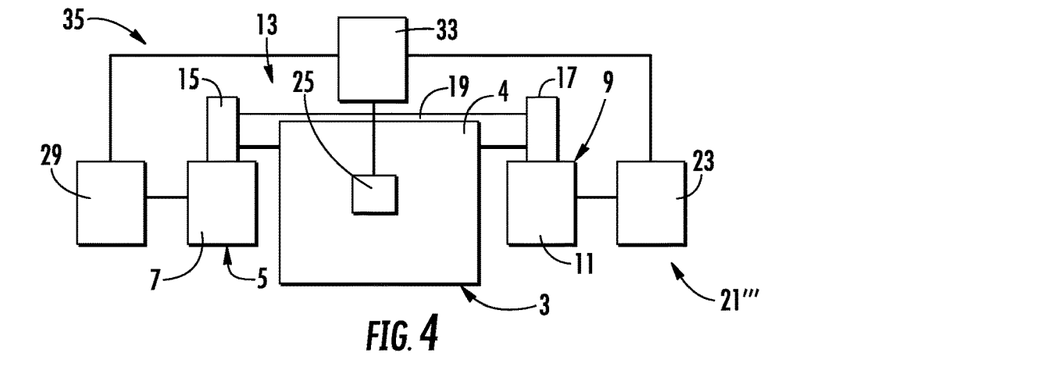
FIG. 4 is a schematic view of a vehicle seat that includes a fourth embodiment of a lateral occupant support positioning system.

FIG. 4 is a schematic view of a vehicle seat 35. The vehicle seat 35 is the same as the vehicle seat 31 except that the vehicle seat 35 includes a lateral occupant support positioning system 21''' that is different from the lateral occupant positioning system 21". The difference between the lateral occupant support positioning system 21''' and the lateral occupant positioning system 21" is that the lateral occupant support positioning system 21'" includes an additional actuator 29 to provide two actuators 23, 29. The additional actuator 29 is connected to the controller device 33 via a wireless connection or a wired connection. The controller device 33 controls actuation of the actuator 23 and the additional actuator based on the input from the sensor 25. The controller device 33 controls the actuator 23 such that the actuator 23 actuates the lateral occupant support structure 9 from the non-deployed position to the deployed position based on the input received from the sensor 25. The controller device 33 controls actuation of the additional actuator 29 such that the additional actuator 29 actuates the lateral occupant support structure 5 from the non-deployed position to the deployed position based on the input received from the sensor 25. The actuator 23 may be a motor, including an electric motor. The additional actuator 29 may be a motor, including an electric motor. This allows the lateral occupant support structure 9 and the lateral occupant support structure 5 to be actuated independently from each other.

Figure 5:
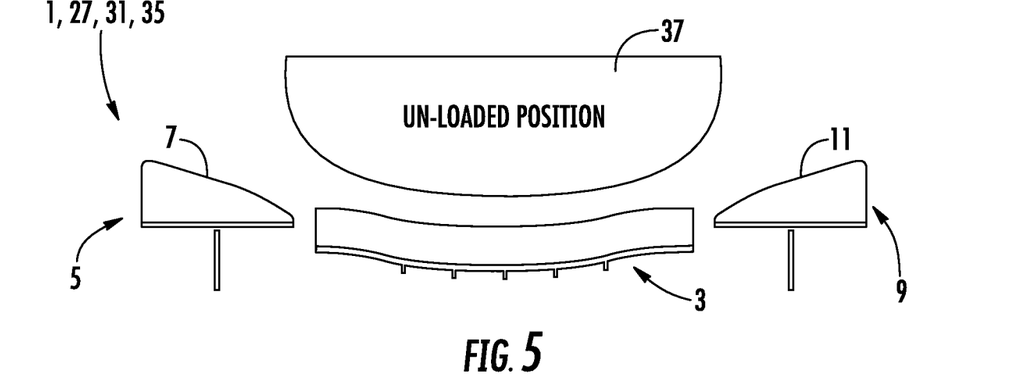
FIG. 5 is a top view of a position of a lateral occupant support structure and a lateral occupant support structure in a non-deployed position prior to an occupant engaging a backrest.

FIG. 5 is a top view of the position of the lateral occupant support structure 5 and the lateral occupant support structure 9 in the non-deployed position prior to the occupant 37 engaging the backrest 3. In the non-deployed position, the lateral occupant support surface 7 and the lateral occupant support surface 11 face in the traveling direction of the vehicle. The non-deployed position of the lateral occupant support structure 5 and the lateral occupant support structure 9 is the same for each vehicle seat 1, 27, 31, 35.

Figure 6:
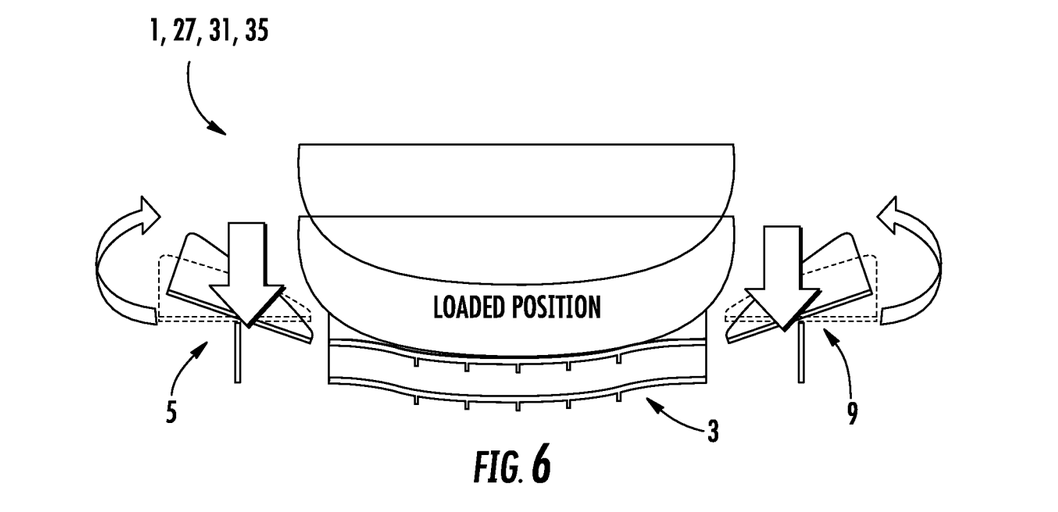
FIG. 6 is a top view of the lateral occupant support structure and the lateral occupant support structure as the lateral occupant support structure and the lateral occupant support structure move in a direction of the backrest and the lateral occupant support structure moves from the non-deployed position to a deployed position.

FIG. 6 is a top view of the position of the lateral occupant support structure 5 and the lateral occupant support structure 9 as the lateral occupant support structure 5 and the lateral occupant support structure 9 pivot (rotate) in a direction of the backrest 3 and the occupant 37 as the occupant engages the backrest 3. As the position of the backrest 3 changes due to the occupant 37 engaging the backrest 3, a position of the lateral occupant support structure 5 and the lateral occupant support structure 9 changes. FIG. 6 shows the position of the lateral occupant support structure 5 and the lateral occupant support structure 9 as the lateral occupant support structure 5 and the lateral occupant support structure 9 transition from the non-deployed position to the deployed position. The transition of the lateral occupant support structure 5 and the lateral occupant support structure 9 from the non-deployed state to the deployed state is the same for each vehicle seat 1, 27, 31, 35.

Figure 7:
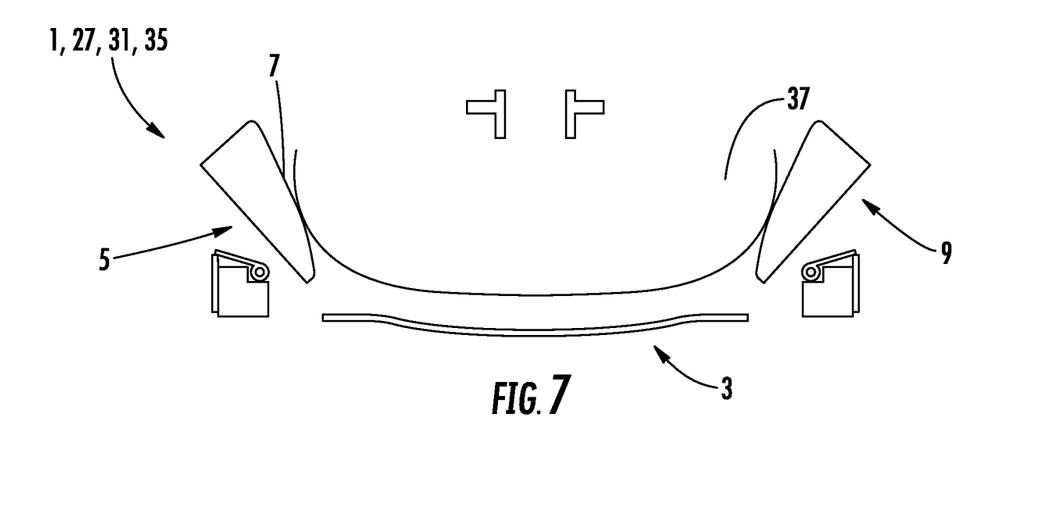
FIG. 7 is a top view of the position of the lateral occupant support structure and the lateral occupant support structure in the deployed position.

FIG. 7 is a top view of the position of the lateral occupant support structure 5 and the lateral occupant support structure 9 in the deployed position. In the deployed position, the lateral occupant support surface 7 engages the torso/thoaraxial region on the one side of the occupant 37 and the lateral occupant support surface 11 engages the another torso/thoaraxial region on the another side of the occupant 37. The deployed state of the lateral occupant support structure 5 and the lateral occupant support structure 9 is the same for each vehicle seat 1, 27, 31, 35.

Figure 8:
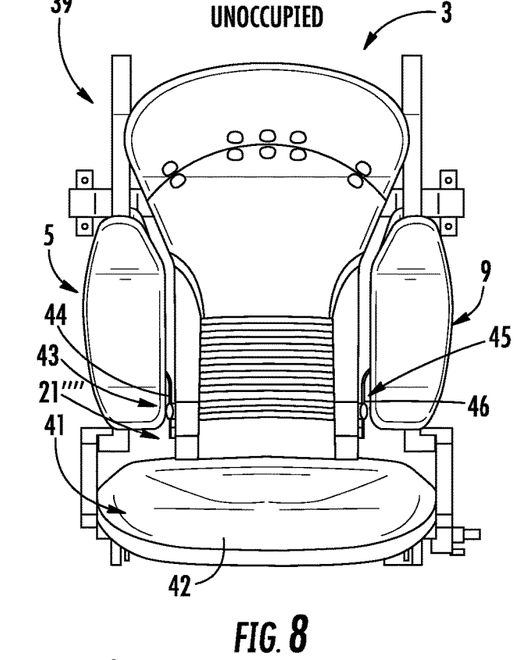
FIG. 8 is a front view of a vehicle seat having a fifth embodiment of a lateral occupant support positioning system.

FIG. 8 is a front view of a vehicle seat 39. The vehicle seat 39 is the same as the vehicle seat 1 except that the vehicle seat 39 includes a lateral occupant support positioning system 21"" that is different from the lateral occupant positioning system 21. The lateral occupant support positioning system 21" includes two actuators 43, 45. The actuator 43 is in the form of a cable 44 and the actuator 45 is the form of a cable 46. The vehicle seat 39 includes a seat part 41 that includes a cushion 42 for supporting at least a buttock portion and a leg portion of the occupant 37. The cable 44 and the cable 46 are connected to the backrest 3. The cable 44 and the cable 46 may also be connected to the seat part 41. The lateral occupant support structure 5 and the lateral occupant support structure 9 are shown in the non-deployed position in FIG. 8.

Figure 9:
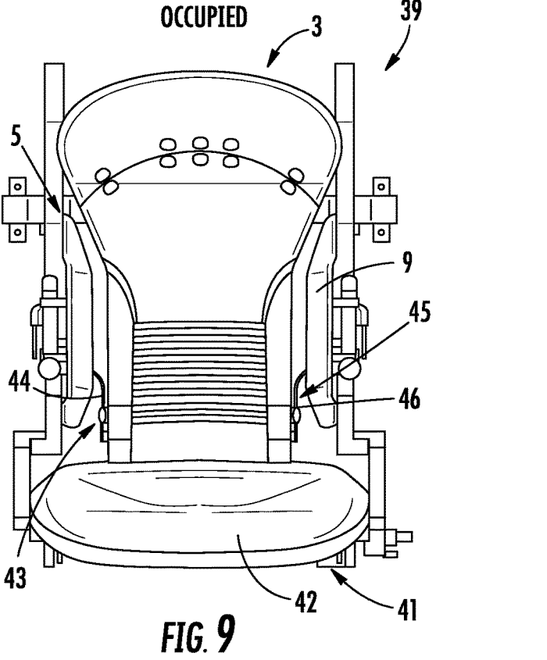
FIG. 9 is another front view of the vehicle seat of FIG. 8.

FIG. 9 is a front view of the vehicle seat 39 with the lateral occupant support structure 5 and the lateral occupant support structure 9 in the deployed position. When the occupant 37 engages at least the backrest 3, the cable 44 detects the movement of the backrest 3 and pulls on the lateral occupant support structure 5 such that the lateral occupant support structure 5 moves from the non-deployed position to the deployed position and the cable 46 detects the movement of the backrest 3 and pulls on the lateral occupant support structure 9 such that the lateral occupant support structure 9 moves from the non-deployed position to the deployed position.

Figure 10:
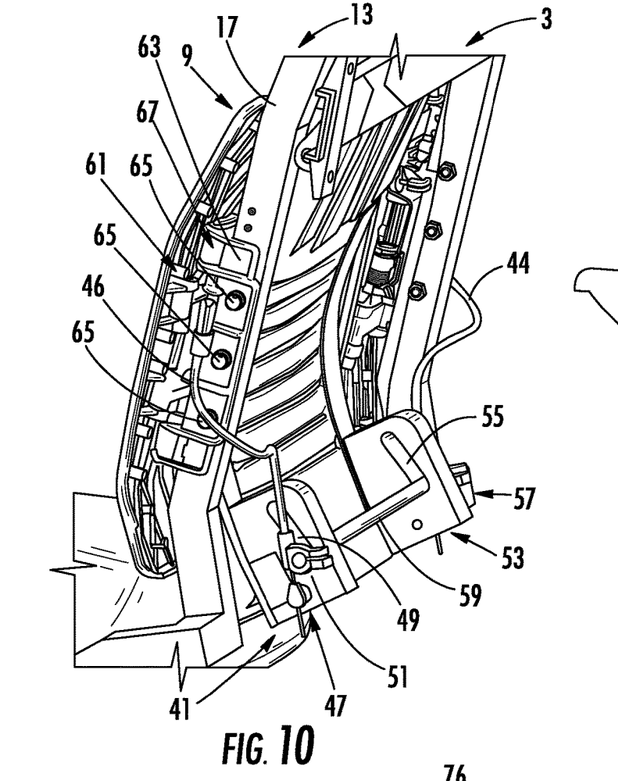
FIG. 10 is a rear perspective view of the vehicle seat of FIG. 8.

FIG. 10 is a rear perspective view of the vehicle seat 39. A connecting structure 47 is connected to a lower portion of a rear portion of the backrest 3. The connecting structure 47 includes a slot 49. A cable connector 51 is connected to the connecting structure 47 to connect the cable 46 to the connecting structure 47 so that the cable 46 is connected to the backrest 3. A connecting structure 53 is connected to the lower portion of the rear portion of the backrest 3 at a spaced location from the connecting structure 47. The connecting structure 53 includes a slot 55. A cable connector 57 is connected to the connecting structure 53 to connect the cable 44 to the connecting structure 53 so that the cable 44 is connected to the backrest 3. A transverse element 59 extends into the slot 49 and the slot 55 to connect the connecting structure 47 to the connecting structure 53.

A lateral occupant support connecting linkage 61 is connected to the seat frame portion 17 of the seat frame 13 and the lateral occupant support structure 9. The lateral occupant support connecting linkage 61 includes a connecting member 63 that is connected to the seat frame portion 17 via fastening elements 65. The fastening elements 65 may be screws, rivets or any other suitable fasteners. In another embodiment, the lateral support connecting element 61 may be connected to the seat frame 13 via welding or another suitable means of connecting the lateral support connecting element 61 to the seat frame 13. The lateral occupant support connecting linkage 61 includes a pivot connection 67. The lateral occupant support structure 9 is pivotably connected to the connecting member 63 via the pivot connection 67 so that the lateral occupant support structure 9 is movable relative to the connecting member 63 when the lateral occupant support structure 9 is actuated.

Figure 11:
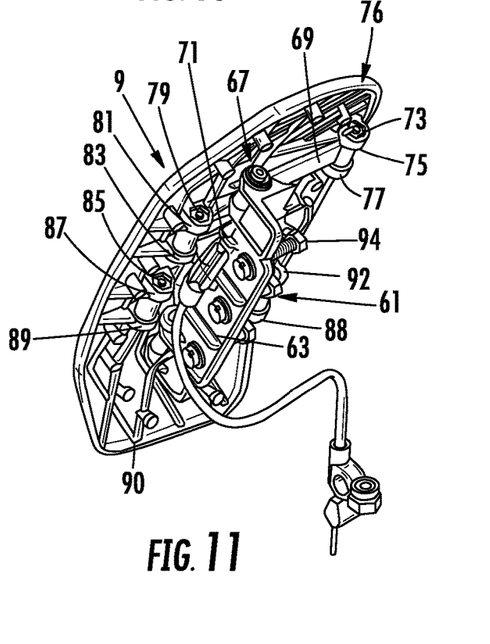
FIG. 11 is a detailed view of a lateral occupant support structure connected to a lateral occupant support connecting linkage.

FIG. 11 is a detailed view of the lateral occupant support structure 9 connected to the lateral occupant support connecting linkage 61. The lateral occupant support structure 9 is in the non-deployed position in FIG. 11. The lateral occupant support connecting linkage 61 includes a connecting member 69, a connecting member 71 and a connecting member 86. The connecting member 69 is connected to a connecting element 75 and a connecting element 77. The connecting element 75 and the connecting element 77 are connected to a rear surface 76 of the lateral occupant support structure 9. The connecting element 75 and the connecting element 77 may be integrally formed on the rear surface 76. A connector element 73 connects the connecting member 69 to the connecting element 75 and the connecting element 77. The connector element 73 may be in the form of a pinion, a screw, a rivet or any other suitable means of connection. The connecting member 71 is connected to a connecting element 81, a connecting element 83, a connecting element 87 and a connecting element 89. The connecting element 81, the connecting element 83, the connecting element 87 and the connecting element 89 are connected to the rear surface 76 of the lateral occupant support structure 9. The connecting element 81, the connecting element 83, the connecting element 87 and the connecting element 89 may be integrally formed on the rear surface 76. A connector element 79 connects the connecting member 71 to the connecting element 81 and the connecting element 83. A connector element 85 connects the connecting member 71 to the connecting element 87 and the connecting element 89. The lateral occupant support connecting linkage 61 includes a pivot connection 90. The connecting member 86 is connected to a connecting element 88 and a connecting element 92. The connecting element 88 and the connecting element 92 are connected to the rear surface 76 of the lateral occupant support structure 9. The connecting element 88 and the connecting element 92 may be integrally formed on the rear surface 76. A connector element 94 connects the connecting member 86 to the connecting element 88 and the connecting element 92. In the non-deployed position, the connecting member 69 and the connecting member 71 are located at approximately 180° to each other. The lateral occupant support structure 5 is connected to the seat frame 13 by a lateral occupant support connecting linkage that has the same features as the lateral occupant connecting linkage 61. The lateral occupant support connecting linkage 61 is used to connect the lateral occupant support structure 9 to the seat frame 13 and a lateral occupant support connecting linkage that has the same features as the lateral occupant connecting linkage 61 is used to connect the lateral occupant support structure 5 to the seat frame 13 in each vehicle seat 1, 27, 31, 39.

Figure 12:
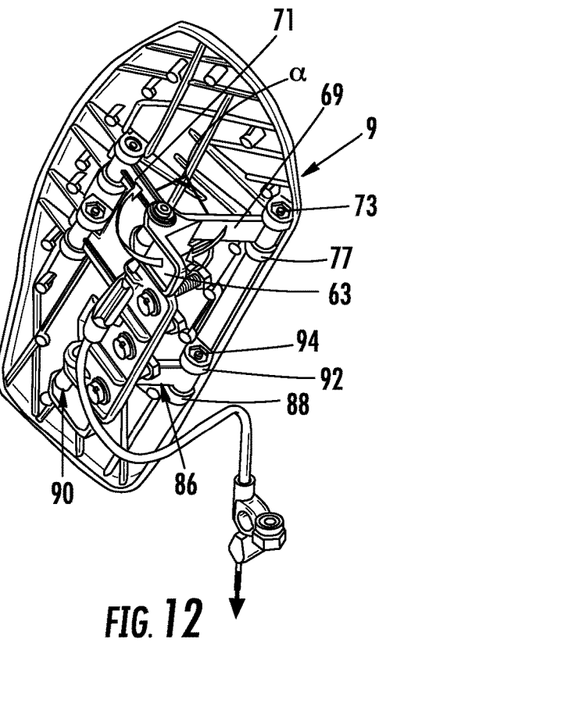
FIG. 12 is another detailed view of the lateral occupant support structure connected to the lateral occupant support connecting linkage.

FIG. 12 is a detailed view of the lateral occupant support structure 9 connected to the lateral occupant support connecting linkage 61. In the deployed position, an angle α between the connecting member 69 and the connecting member 71 is greater than zero and less then 180°. In FIG. 12, when the occupant engages the backrest 3 to change a position of the backrest 3, the cable 46 pulls on the lateral occupant connecting linkage 61 such that the lateral occupant support structure 9 moves relative to the connecting member 63 and the seat frame 13 from the non-deployed position to the deployed position. The lateral occupant support structure 5 is actuated via the cable 44 in the same manner as shown in FIG. 12, but is not discussed in order to avoid repetition.

Figure 13:
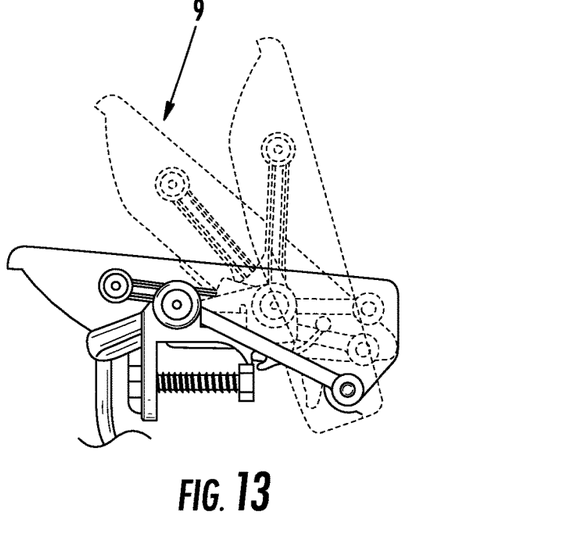
FIG. 13 is a top view of the lateral occupant support structure showing movement of the lateral occupant support structure of FIG. 12 as the lateral occupant support structure moves from the non-deployed position to the deployed position.

FIG. 13 is a top view of the lateral occupant support structure 9 showing the movement of the occupant support structure 9 as the occupant support structure 9 moves from a non-deployed position to a deployed position. The occupant support structure 9 may rotate between a range from 0° to 90°. The occupant support structure 9 may be designed to have 69° of rotation for 31 mm. of cable throw where the cable is drive by a vertical deflection of a seatback surface.

Figure 14:
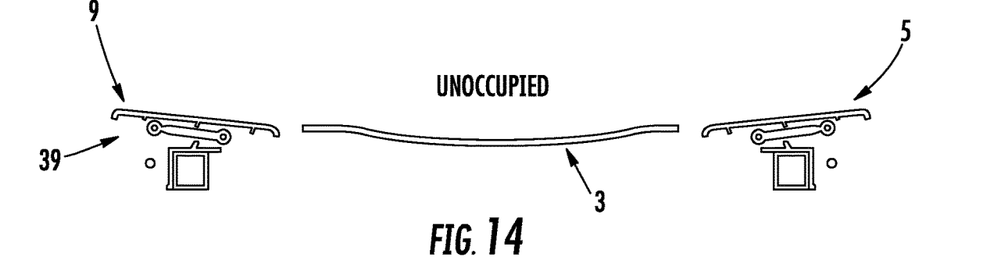
FIG. 14 is a top view of the vehicle seat of FIG. 8.

FIG. 14 is a top view of the lateral occupant support structure 5 and the lateral occupant support structure 9 in the non-deployed position prior to the occupant engaging the backrest 3. In the non-deployed position, the lateral occupant support surface 7 and the lateral occupant support surface 11 face in the traveling direction of the vehicle.

Figure 15:
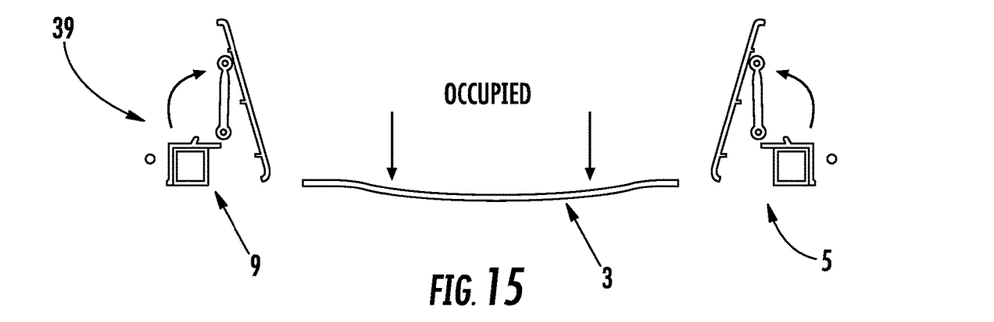
FIG. 15 is another top view of the vehicle seat of FIG. 8.

FIG. 15 is a top view of the position of the lateral occupant support structure 5 and the lateral occupant support structure 9 in the deployed position. In the deployed position, the lateral occupant support surface 7 engages the torso/thoaraxial region on the one side of the occupant 37 and the lateral occupant support surface 11 engages the another torso/thoaraxial region on the another side of the occupant 37. The deployed state of the lateral occupant support structure 5 and the lateral occupant support structure 9 is the same for each vehicle seat 1, 27, 31, 35.

Figure 16:
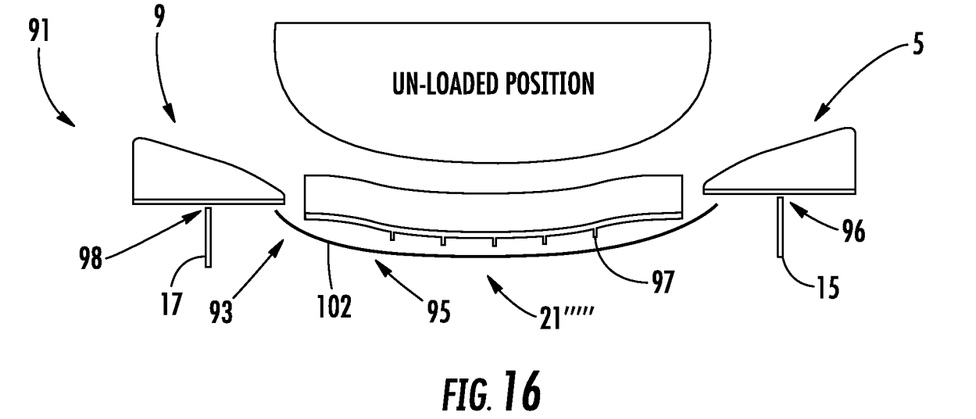
FIG. 16 is a top view of a vehicle seat having a sixth embodiment of a lateral occupant support positioning system.

FIG. 16 is a top view of a vehicle seat 91. The vehicle seat 91 includes the lateral occupant support structure 5, the lateral occupant support structure 9, the backrest 3 and a lateral occupant support positioning system 21''''. The lateral occupant support structure 5 is connected to the seat frame portion 15 via a hinge connection 96 to allow the lateral occupant support structure 5 to move from the non-deployed position to the deployed position. The lateral occupant support structure 9 is connected to the seat frame portion 17 via a hinge connection 98 to allow the lateral occupant support structure 9 to move from the non-deployed position to the deployed position. The lateral occupant support positioning system 21'''' includes a lateral occupant support structure connecting structure 95. The lateral occupant support structure connecting structure 95 is connected to the lateral occupant support structure 5 and the lateral occupant support structure 9. The lateral occupant support structure connecting structure 95 extends opposite a rear surface 97 of the backrest 3. The lateral occupant support structure connecting structure 95 is in the form of an elastic band 102. The lateral occupant support structure 5 and the lateral occupant support structure 9 are shown in the non-deployed position in FIG. 16. When the occupant engages the backrest 3, the backrest 3 moves and the movement of the backrest 3 is detected by the lateral occupant support structure connecting structure 95 and the lateral occupant support structure connecting structure 95 actuates the lateral occupant support structure 5 and the lateral occupant support structure 9 based on the movement of the backrest 3 such that the lateral occupant support structure 5 and the lateral occupant support structure 9 are rotated in a direction of the backrest 3 and the occupant.

Figure 17:
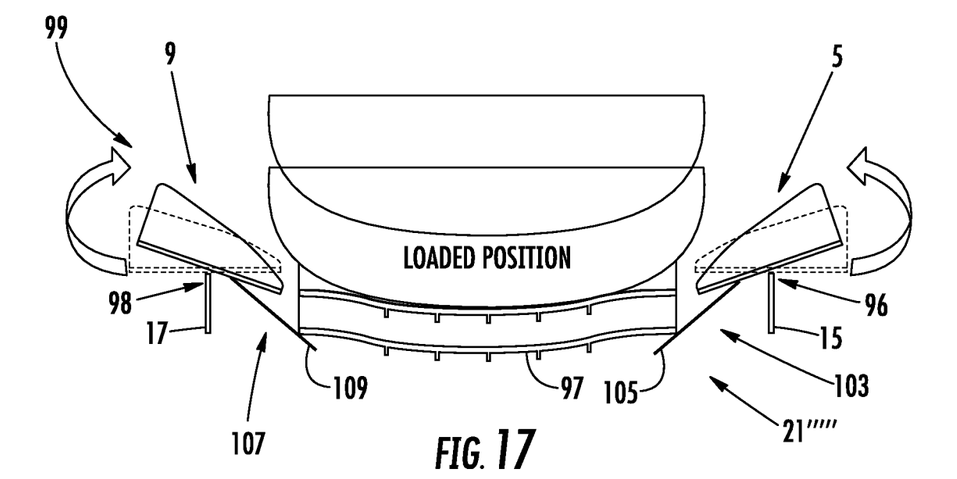
FIG. 17 is a top view of a vehicle seat having a seventh embodiment of a lateral occupant support positioning system.

FIG. 17 is a top view of a vehicle seat 99. The vehicle seat 99 includes the lateral occupant support structure 5, the lateral occupant support structure 9, the backrest 3 and a lateral occupant support positioning system 21''''. The lateral occupant support structure 5 is connected to the seat frame portion 15 via a hinge connection 96 to allow the lateral occupant support structure 5 to move from the non-deployed position to the deployed position. The lateral occupant support structure 9 is connected to the seat frame portion 17 via a hinge connection 98 to allow the lateral occupant support structure 9 to move from the non-deployed position to the deployed position. The lateral occupant support positioning system 21'''' includes a lateral occupant support structure connecting structure 103 and a lateral occupant support structure connecting structure 107. The lateral occupant support structure connecting structure 103 is connected to the lateral occupant support structure 5 and the backrest 3. The lateral occupant support structure connecting structure 103 contacts the rear surface 97 of the backrest 3 and a rear surface of the lateral occupant support structure 5. The lateral occupant support structure connecting structure 103 may be in the form of a plate 105, but may be in the form of any other suitable structure. The lateral occupant support structure connecting structure 107 is connected to the lateral occupant support structure 9 and the backrest 3. The lateral occupant support structure connecting structure 107 contacts the rear surface 97 and a rear surface of the lateral occupant support structure 9. The lateral occupant support structure connecting structure 107 may be in the form of a plate 109, but may be in the form of any other suitable structure. The lateral occupant support structure 5 and the lateral occupant support structure 9 are shown in the non-deployed position in FIG. 16. When the occupant engages the backrest 3, the backrest 3 moves and the movement of the backrest 3 is detected by the lateral occupant support structure connecting structure 103 and the lateral occupant support structure connecting structure 107 and the lateral occupant support structure connecting structure 103 actuates the lateral occupant support structure 5 and the lateral occupant support structure connecting structure 107 actuates the lateral occupant support structure 9 based on the movement of the backrest 3 such that the lateral occupant support structure 5 and the lateral occupant support structure 9 are rotated in a direction of the backrest 3 and the occupant.

Figure 18:
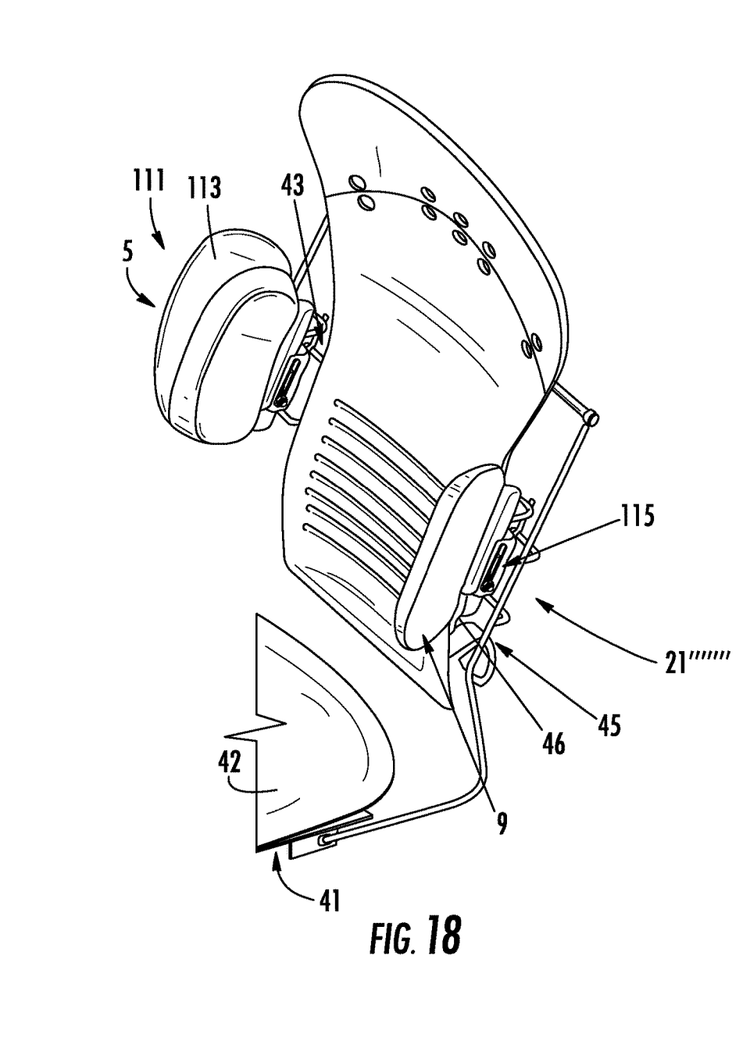
FIG. 18 is a perspective view of a vehicle seat having an eighth embodiment of a lateral occupant positioning system.

FIG. 18 is a perspective view of a vehicle seat 111. The vehicle seat 111 includes the lateral occupant support structure 5, the lateral occupant support structure 9, the backrest 3 and a lateral occupant support positioning system 21''''''. The lateral occupant support positioning system 21'''''' includes two actuators 43, 45. The actuator 43 is in the form of a cable 44 and the actuator 45 is the form of a cable 46. The vehicle seat 111 includes the seat part 41 that includes the cushion 42 for supporting at least the buttock portion and the leg portion of the occupant 37. The cable 44 and the cable 46 are connected to the backrest 3. The cable 44 is connected to a helical slide 113. The cable 46 is connected to a helical slide 115. The lateral occupant support structure 5 and the lateral occupant support structure 9 are shown in the deployed position in FIG. 18. When the occupant engages at least the backrest 3, the cable 44 detects the movement of the backrest 3 and pulls on the helical slide 113 such that the lateral occupant support structure 5 moves from the non-deployed position to the deployed position and the cable 46 detects the movement of the backrest 3 and pulls on the helical slide 115 such that the lateral occupant support structure 9 moves from the non-deployed position to the deployed position.

Figure 19:
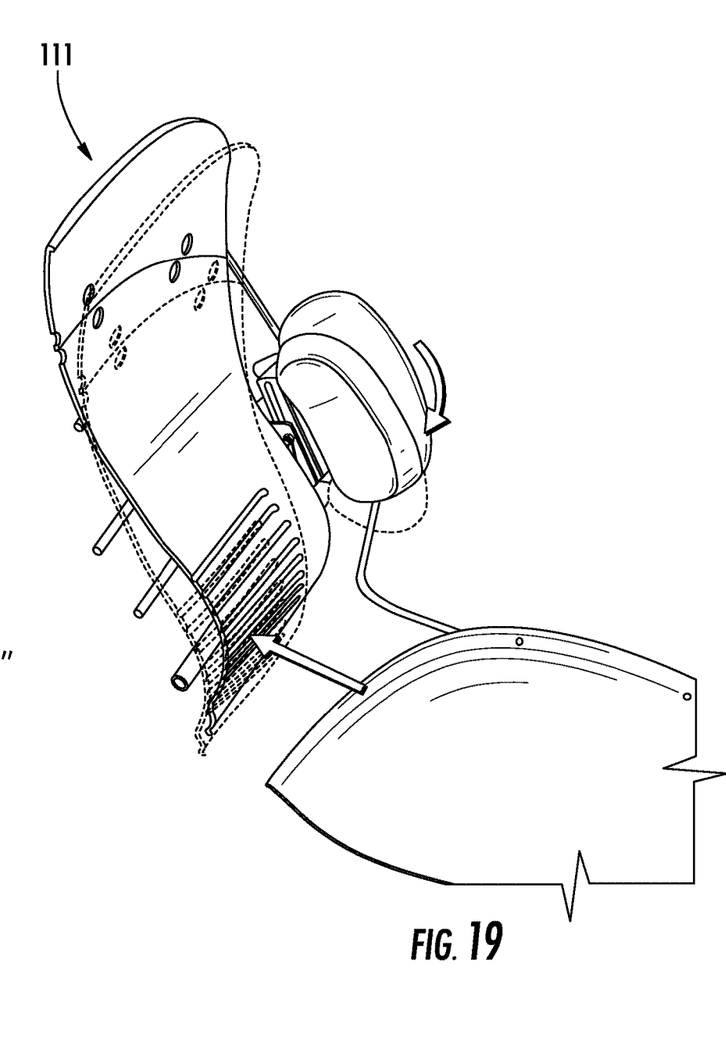
FIG. 19 is another perspective view of the vehicle seat of FIG. 18.

FIG. 19 is another perspective view of the vehicle seat 111 of FIG. 18 showing movement of the lateral occupant support structure 9 from the non-deployed position to the deployed position.

Figure 20:
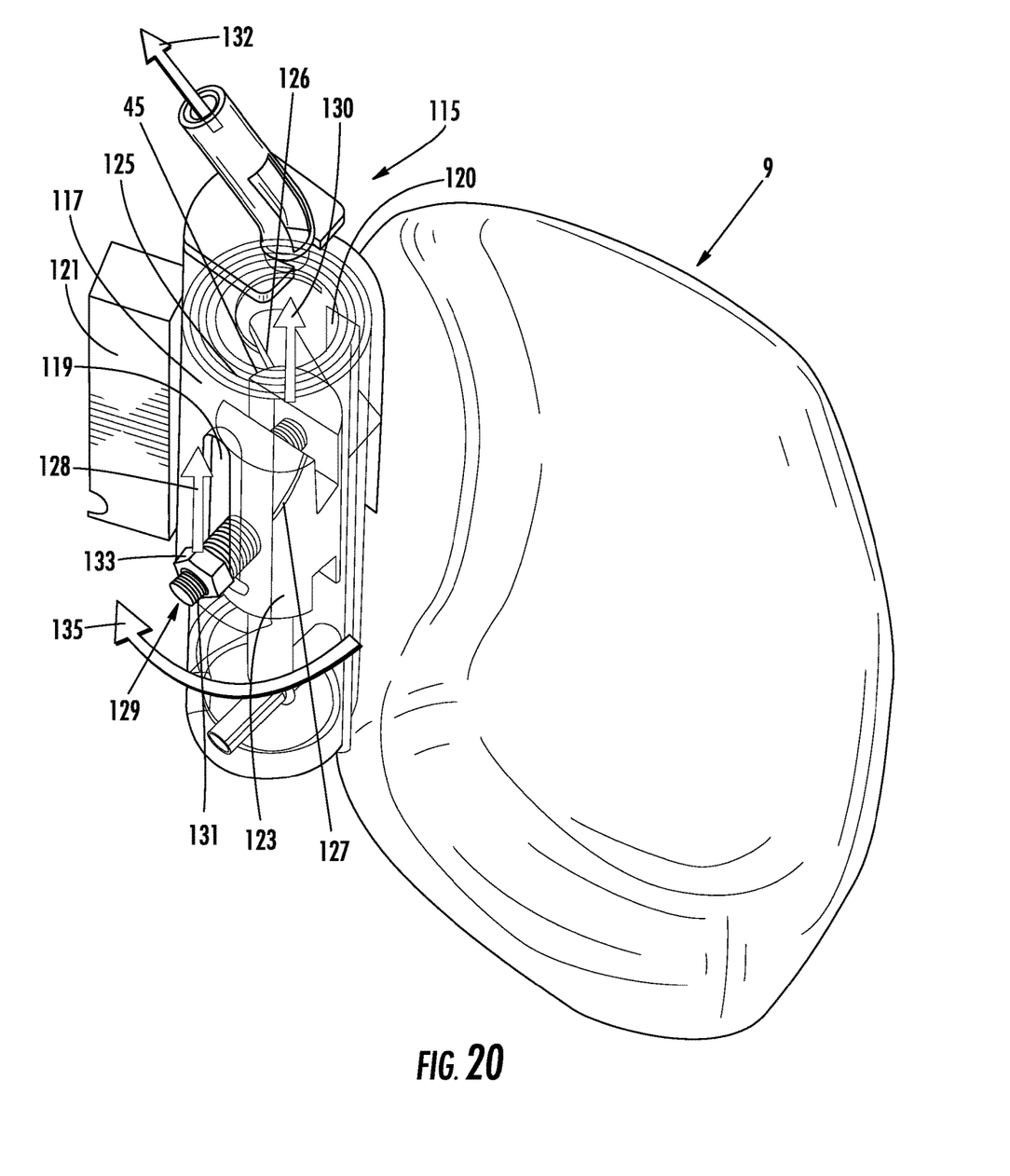
FIG. 20 is an enlarged view of a helical slide.

FIG. 20 is an enlarged view of the helical slide 115. The helical slide 115 is identical to the helical slide 113. In order to avoid repetition, a description of the helical slide 113 is not provided as it has features that are identical to the features of the helical slide 113. The helical slide 115 includes a component 117. The component 117 may have a cylindrical shape, but any other suitable shape may be provided. The component defines an outer portion of the helical slide 115. The component 117 includes a slot 119. The component 117 may include another slot 120 to provide at least two slots. The helical slide 115 includes a seat frame connecting element 121 that connects the helical slide 115 to the seat frame 13. The helical slide 115 includes movable element 123. The movable element 123 may be provided in the center of the helical slide 115, inward of the component 117. The helical slide 115 includes a lateral occupant support structure connecting portion 125 that connects the helical slide 115 to the lateral occupant support structure 9. The lateral occupant support structure connecting portion 125 may be formed by a portion of the lateral occupant support structure 9. The lateral occupant support structure connecting portion 125 includes a slot 127. The lateral occupant support structure connecting portion 125 may include another slot 126 to provide at least two slots. The slot 127 is provided at an angle relative to the slot 119 with the angle being greater than 0°. The slot 126 is provided at an angle relative to the slot 120 with the angle being greater than 0°. The lateral occupant support structure connecting portion 125 is arranged between the component 117 and the movable element 123. A fastener 129 extends through the slot 119, the slot 127, the slot 120, the slot 126 and the movable element 123. The fastener 129 may include a threaded screw 131 and a nut 133 and another nut that is connected to the threaded screw 131. However, the fastener 129 may be any other suitable fastener. In another embodiment, a fastener may be fixed to the movable element 123 and extend through the slot 119 and the slot 127 and another fastener may be fixed to the movable element 123 and extend through the slot 120 and the slot 126. The movable element 123 is connected to the cable 45. When the cable 45 is actuated in the direction of arrow 132, the movable element 123 moves in an upward direction as shown by arrow 130 and the fastener 129 moves along the slot 127 and the fastener 129 moves along the slot 119 in the upward direction as shown by arrow 128 such that the lateral occupant support structure 9 rotates in a direction of the occupant as shown by arrow 135.

Figure 21:
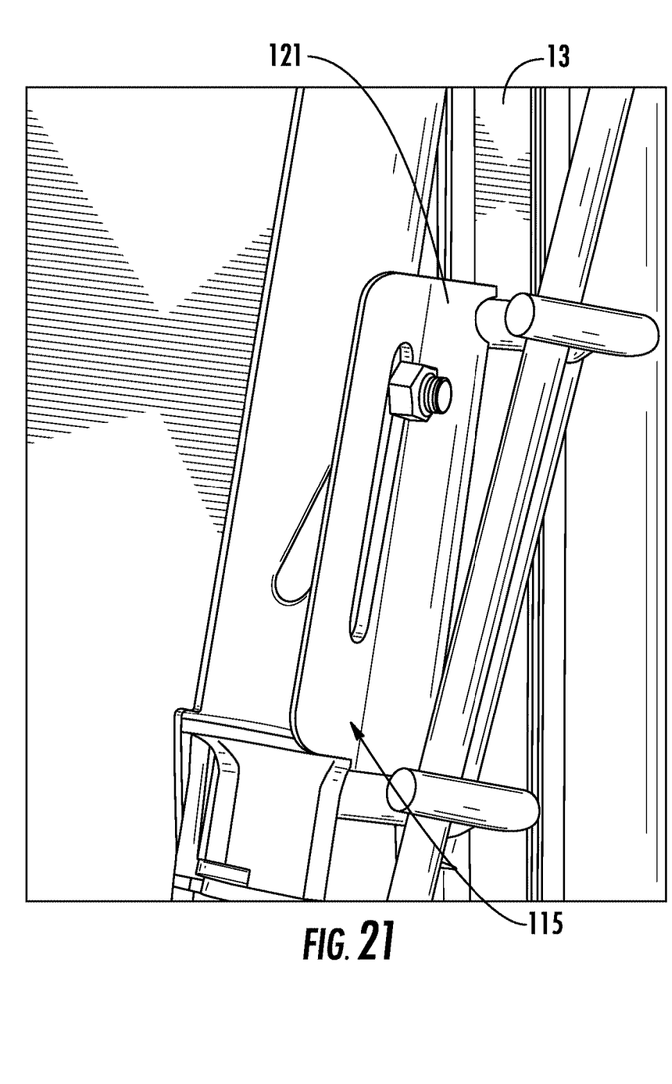
FIG. 21 is another enlarged view of the helical slide of the FIG. 20.

FIG. 21 is another enlarged view of the helical slide 115 with the seat frame connecting element 121 connected to the seat frame 13.

Figure 22:
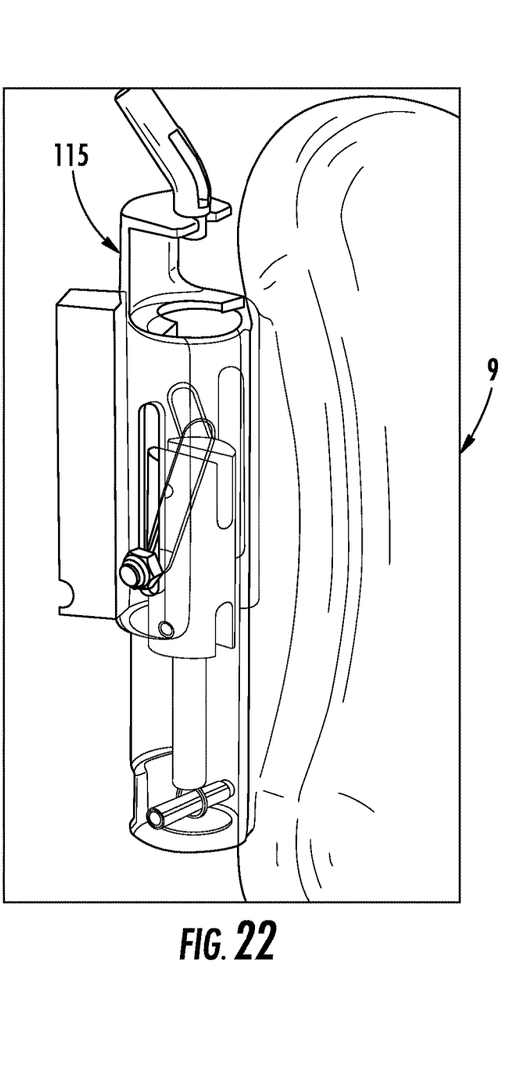
FIG. 22 is yet another enlarged view of the helical slide of FIG. 20.

FIG. 22 is yet another enlarged view of the helical slide 115.

While specific embodiments of the invention have been shown and described in detail to illustrate the application of the principles of the invention, it will be understood that the invention may be embodied otherwise without departing from such principles.

LIST OF REFERENCE CHARACTERS

1 Vehicle seat
3 Backrest
4 Backrest surface
5 Lateral occupant support structure
7 Lateral occupant support surface
9 Lateral occupant support structure
11 Lateral occupant support surface
13 Seat frame
15 Seat frame portion
17 Seat frame portion
19 Transverse seat frame portion
21 Lateral occupant support positioning system
21' Lateral occupant support positioning system
21'' Lateral occupant support positioning system
21''' Lateral occupant support positioning system
21'''' Lateral occupant support positioning system
21''''' Lateral occupant support positioning system
21'''''' Lateral occupant support positioning system
21''''''' Lateral occupant support positioning system
23 Actuator
25 Sensor
27 Vehicle seat
29 Actuator
31 Vehicle seat
33 Controller device
35 Vehicle seat
37 Occupant
39 Vehicle seat
41 Seat part
43 Actuator
44 Cable
45 Actuator
46 Cable
47 Connecting structure 49 Slot
51 Cable connector
53 Connecting structure
55 Slot
57 Cable connector
59 Transverse element
61 Lateral occupant support connecting linkage
63 Connecting member
65 Fastening element
67 Pivot connection
69 Connecting member
71 Connecting member
73 Connector element
75 Connecting element
76 Rear Surface
77 Connecting element
79 Connector element
81 Connecting element
83 Connecting element
85 Connector element
86 Connecting member
87 Connecting element
88 Connecting element
89 Connecting element
90 Pivot connection
91 Vehicle seat
92 Connecting element
94 Connector element
95 Lateral occupant support structure connecting structure
α Angle
96 Hinge connection
97 Rear surface
98 Hinge
99 Vehicle seat
102 Elastic band
103 Lateral occupant support structure connecting structure
105 Plate
107 Lateral occupant support structure connecting structure
109 Plate
111 Vehicle seat
113 Helical slide
115 Helical slide
117 Component
119 Slot
120 Slot
121 Seat frame connecting element
123 Movable element
125 Lateral occupant support structure connecting portion
126 Slot
127 Slot
129 Fastener
131 Threaded screw
133 Nut
132 Arrow
133 Nut
135 Arrow

What is claimed is:

1. A vehicle seat comprising:
a backrest;
a lateral occupant support structure;
a sensor detecting a position of said backrest, said sensor comprises a first cable;
an actuator connected to said sensor, said actuator adjusting a position of said lateral occupant support structure based on input from said sensor;
wherein said first cable is connected to a connecting structure, wherein said connecting structure has a slot adapted to receive a transverse element movable within the slot.

2. A vehicle seat in accordance with claim 1, further comprising:
another lateral occupant support structure, said actuator adjusting a position of said another lateral occupant support structure based on said input from said sensor;
wherein said connecting structure is connected to a lower portion of a rear portion of a backrest for the vehicle seat.

3. A vehicle seat in accordance with claim 1, further comprising:
another lateral occupant support structure;
another actuator connected to said sensor, said another actuator adjusting a position of said another lateral occupant support structure based on input from said sensor.

4. A vehicle seat in accordance with claim 1, further comprising:
a seat frame;
a pivotable connection between said seat frame and said lateral occupant support structure, said first cable connected to said backrest and said lateral occupant support structure;
wherein said transverse element extends along a lower portion of a rear portion of a backrest of said seat frame.

5. A vehicle seat in accordance with claim 3, further comprising:
a seat frame;
a pivotable connection between said seat frame and said lateral occupant support structure, said sensor comprising said first cable connected to said backrest and said lateral occupant support structure and a second cable connected to said backrest and said another lateral occupant support structure;
another pivotable connection between said seat frame and said another lateral occupant support structure, said another actuator comprising said second cable and said pivotable connection;
wherein said first cable is connected to a first cable connector, said first cable connector connected to a first connecting structure on one side of said seat frame;
wherein said second cable is connected to a second cable connector, said second cable connector connected to a second connecting structure on an opposite side of said seat frame,
wherein said transverse element extends between said first and said second connecting structures.

6. A vehicle seat in accordance with claim 2, further comprising:
a seat frame;
a pivotable connection between said seat frame and said lateral occupant support structure;
another pivotable connection between said seat frame and said another lateral occupant support structure, said sensor comprising a flexible band extending from said lateral occupant support structure to said another lateral occupant support structure, at least a portion of said band being in contact with a rear surface of said backrest, said actuator comprising said pivotable connection, said another pivotable connection and said flexible band.

7. A vehicle seat in accordance with claim 3, further comprising:
a seat frame;

a pivotable connection between said seat frame and said lateral occupant support structure, and said connecting structure connected to said lateral occupant support structure and said backrest;

another pivotable connection between said seat frame and said another lateral occupant support structure, said another actuator comprising said another pivotable connection and another connecting structure connected to said another lateral occupant support structure and said backrest, said sensor comprising said connecting structure and said another connecting structure.

8. A vehicle seat in accordance with claim 3, wherein said sensor comprises a first cable connected to said backrest and a first helical slide and a second cable connected to said backrest and a second helical slide, said lateral occupant support structure being connected to said first helical slide, said lateral occupant support structure and a second cable being connected to said backrest and said another lateral occupant support structure, said actuator comprising said first cable and said first helical slide, said another lateral occupant support structure being connected to said second helical slide, said another actuator comprising said second cable and said second helical slide.

9. A vehicle seat in accordance with claim 3, wherein said another lateral occupant support structure is located on one side of said backrest and said lateral seat support structure is located on another side of said backrest.

10. A vehicle seat in accordance with claim 1, wherein said sensor detects at least a deflection of said backrest from an unloaded position to a loaded position of said backrest, said actuator actuating said lateral occupant support structure such that said lateral occupant support structure is rotated inward in a direction of said backrest from a non-deployed position to a deployed position when said sensor detects deflection of said backrest from said unloaded position to said loaded position of said backrest, said lateral occupant support structure configured to engage one or more of a torso region of an occupant of the vehicle seat and a thoaraxial region of the occupant of the vehicle seat in said deployed position.

11. A vehicle seat comprising:
a backrest;
a lateral occupant support structure;
a lateral occupant support structure setting system setting a position of said lateral support structure based on a position of said backrest;
wherein said system comprises a sensor having one end connected to said lateral occupant support structure and another end connected to a first lateral occupant support structure connecting structure,
wherein said first lateral occupant support structure connecting structure has a slot adapted to receive a transverse element, said transverse element extending across a lower portion of said backrest.

12. A vehicle seat in accordance with claim 11, further comprising:
a seat frame;
another lateral occupant support structure, said lateral occupant support structure and said another lateral occupant support structure being pivotably connected to said seat frame.

13. A vehicle seat in accordance with claim 12, wherein said lateral occupant support structure setting system comprises an actuator, said sensor detecting a position of said backrest, said actuator receiving input from said sensor, said actuator actuating said lateral occupant support structure and said another lateral occupant support structure based on input from said sensor.

14. A vehicle seat in accordance with claim 12, wherein said lateral occupant support structure setting system comprises another actuator, said another actuator receiving input from said sensor, said actuator actuating said another lateral occupant support structure based on input from said sensor.

15. A vehicle seat in accordance with claim 12, wherein said lateral occupant support structure setting system comprises a first cable connected to said backrest and said lateral occupant support structure and a second cable connected to said backrest and said another lateral occupant support structure, said first cable actuating said lateral occupant support structure such that said lateral occupant support structure is rotated inward in a direction of said backrest from a non-deployed position to a deployed position when said backrest moves from an unloaded position to a loaded position, said second cable actuating said another lateral occupant support structure such that said another lateral occupant support structure is rotated inward in a direction of said backrest from a non-occupied position to an occupied position when said backrest moves from said unloaded position to said loaded position.

16. A vehicle seat in accordance with claim 12, wherein said lateral occupant support structure setting system comprises a lateral occupant support structure connecting structure extending from said lateral occupant support structure to said another lateral occupant support structure, at least a portion of said lateral occupant support structure connecting structure engaging a rear surface of said backrest, said lateral occupant support structure connecting structure actuating said lateral occupant support structure and said another lateral occupant support structure such that each of said lateral occupant support structure and said another lateral occupant support structure is rotated inward in a direction of said backrest from a non-occupied position to an occupied position when said backrest moves from an unloaded position to a loaded position.

17. A vehicle seat in accordance with claim 12, wherein said lateral occupant support structure setting system comprises said first lateral occupant support structure connecting structure extending from said lateral occupant support structure to said backrest and a second lateral occupant support structure connecting structure extending from said another lateral occupant support structure to said backrest, said first lateral occupant support structure connecting structure actuating said lateral occupant support structure such that said lateral occupant support structure is rotated inward in a direction of an occupant of the vehicle seat from a non-deployed position to a deployed position when said backrest moves from an unloaded position to a loaded position, said second lateral occupant support structure connecting structure actuating said another lateral occupant support structure such that said another lateral occupant support structure is rotated inward in a direction of the occupant of the vehicle seat from an another lateral occupant support structure non-deployed position to an another lateral occupant support structure deployed position when said backrest moves from said unloaded position to said loaded position.

18. A vehicle seat in accordance with claim 12, wherein said lateral occupant support structure setting system comprises a first cable connected to said backrest and a first helical slide and a second cable connected to said backrest and a second helical slide, said lateral occupant support structure being connected to said first helical slide, said another lateral occupant support structure being connected to said second helical slide, said first cable actuating said lateral occupant support structure via said first helical slide such that said lateral occupant support structure rotates inward in a direction of an occupant of the vehicle seat from a non-deployed position to a deployed position when said backrest moves from an unloaded position to a loaded position, said second cable actuating said another lateral occupant support structure via said second helical element such that said another lateral occupant support structure rotates inward in a direction of the occupant of the vehicle seat from another lateral occupant support structure non-deployed position to an another lateral occupant support structure deployed position when said backrest moves from said unloaded position to said loaded position.

19. A vehicle seat in accordance with claim 12, wherein said another lateral occupant support structure is located on one side of said backrest and said lateral occupant support structure is located on another side of said backrest.

20. A vehicle seat in accordance with claim 12, wherein said another lateral occupant support structure is located at a spaced location from said lateral occupant support structure.

* * * * *